(12) United States Patent
Spurgeon

(10) Patent No.: US 6,962,339 B1
(45) Date of Patent: Nov. 8, 2005

(54) BELLOWS TYPE MECHANICAL SEAL

(75) Inventor: James D. Spurgeon, Martinez, GA (US)

(73) Assignee: Infinity Manufacturing, Inc., Martinez, GA (US)

( * ) Notice: Subject to any disclaimer, the term of this patent is extended or adjusted under 35 U.S.C. 154(b) by 466 days.

(21) Appl. No.: 09/732,391

(22) Filed: Dec. 7, 2000

Related U.S. Application Data

(60) Provisional application No. 60/169,312, filed on Dec. 7, 1999.

(51) Int. Cl.[7] .............................................. F16J 15/34
(52) U.S. Cl. ..................................... 277/358; 277/404
(58) Field of Search ................................ 277/358, 361, 277/362, 363, 367, 390, 391, 392, 393, 404, 277/938

(56) References Cited

U.S. PATENT DOCUMENTS

| | | | |
|---|---|---|---|
| 2,464,136 A * | 3/1949 | Jenkins ....................... 277/391 |
| 3,028,163 A | 4/1962 | Heinrich |
| 3,218,086 A | 11/1965 | Donley |
| 3,391,941 A | 7/1968 | Donley |
| 3,492,008 A | 1/1970 | Donley |
| 3,507,504 A | 4/1970 | Donley |
| 3,560,004 A * | 2/1971 | Donley et al. ............... 277/363 |
| 3,601,413 A * | 8/1971 | Darnell ........................ 277/404 |
| 4,819,948 A * | 4/1989 | Merrifield .................... 277/419 |
| 4,936,593 A * | 6/1990 | Finney ......................... 277/391 |
| 5,435,574 A * | 7/1995 | Victor et al. ................. 277/379 |

* cited by examiner

*Primary Examiner*—Doug Hutton
(74) *Attorney, Agent, or Firm*—Pearne & Gordon LLP

(57) ABSTRACT

A sealing system for sealing one end of a rotating shaft from fluids. The sealing system includes a resilient bellows element connected at each end to a thrust plate. The bellows acts like a compression spring forcing the thrust plates against respective sealing elements and thereby forming two dynamic seals around the shaft. Each of the dynamic seals alternately rotate with the shaft, depending upon the respective forces of friction acting on each.

2 Claims, 2 Drawing Sheets

BELLOWS TYPE MECHANICAL SEAL

CROSS-REFERENCE TO RELATED APPLICATIONS

This application claims the benefit of U.S. Provisional Application No. 60/169,312, filed Dec. 7, 1999.

BACKGROUND OF THE INVENTION

The present invention relates generally to sealing systems for rotating machines and, more specifically, to an improved sealing assembly used therein.

Sealing systems are often used in machine applications to provide a seal between a rotating shaft and a machine housing, wall or other stationary element of a machine. Such machine applications include, but are not limited to, fluid pumps and fluid mixing machines. The seal may be provided to prevent fluids being worked on, such as a liquid being pumped, from entering either the drive mechanism of the machine or the atmosphere.

These machines generally include a stationary element (such as a housing), a drive element (such as a shaft), and a driven element (such as an impeller) connected to the drive element. One way to provide a rotatable seal between the drive element and the stationary element is by providing two sealing rings and leaf springs. One ring forms a seal with a sealing face that is rigidly attached to the stationary element. The other ring forms a seal with a sealing face that is fixed to the driven part. The two sealing rings are biased against their respective sealing faces by the leaf springs. The resulting seal is actually two rotatable seals placed in series.

One such sealing system is shown and described in U.S. Pat. No. 3,028,163 to Heinrich. Sealing systems having only one rotatable seal are also known. All of these sealing systems are complex and thus inherently prone to failure.

SUMMARY OF THE INVENTION

The present invention is directed to a sealing system for a rotating machine having a stationary element and a drive element rotationally connected to the stationary element. The sealing system includes a plate having a bearing surface. The plate is rigidly connected to either the drive element or the stationary element. The sealing system also includes a sealing assembly having a resilient bellows secured to a thrust plate having a bearing surface. The bellows provides a force on the thrust plate forcing the bearing surface of the thrust plate against the bearing surface of the other plate to form a dynamic seal.

According to a further aspect of the invention, the resilient bellows comprises a collar to which the thrust plate is secured.

According to yet another aspect of the invention, the sealing assembly has a static sealing element disposed within a gap provided between the collar and the thrust plate.

According to a even further aspect of the invention, a mounting element provides the connection of the plate to either the drive element or the stationary element.

DESCRIPTION OF THE INVENTION

Figure 1:
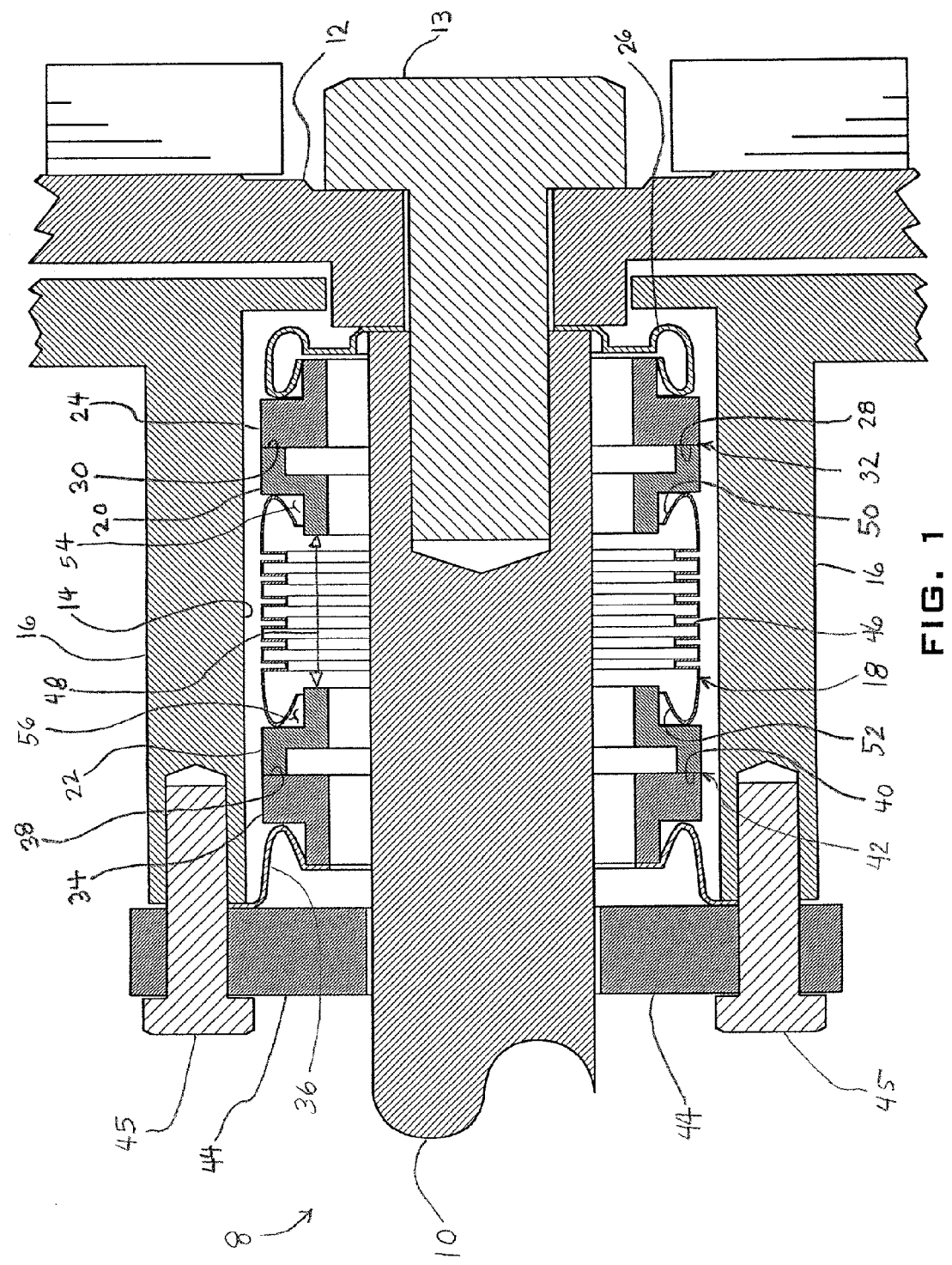
FIG. 1 shows a sectional side view of a portion of a rotating machine having a seal according to the invention.

Referring to FIG. 1, a rotating machine 8, such as a pump, includes a drive element or shaft 10, and a driven element or work implement 12, such as an impeller, propeller, or mixing bars. The implement 12 is secured to the drive shaft 10 by a bolt 13. It should be appreciated that while, in the present embodiment, the drive element is a shaft, any suitable rotational drive element could be substituted therefor.

The drive shaft 10 extends through a seal chamber 14 defined by a housing 16 of the machine 8. The housing 16 is a stationary element of the machine 8. A bellows sealing assembly 17 is disposed on the drive shaft 10 in the seal chamber 14. The bellows sealing assembly 17 comprises a resilient bellows 18 holding a thrust plate 20, 22 at each end.

A drive plate 24 is mounted to the drive shaft 10 by a first mounting element or drive plate mount 26, such that the drive plate rotates with the shaft 10. The drive plate 24 has a bearing surface 28.

A bearing surface 30 at the free end of the first thrust plate 20 bears on the bearing surface 28 of the drive plate 24. As explained below in detail, a first dynamic (rotatable) seal 32 is formed at the interface between these bearing surfaces 28, 30.

A stationary plate 34 is mounted to the housing 16 by second mounting element or a stationary plate mount 36. The stationary plate 34 has a bearing surface 38.

A bearing surface 40 at the free end of the second thrust plate 22 bears on the bearing surface 38 of the stationary plate 34. As explained below in detail, a second dynamic (rotatable) seal 42 is formed at the interface between these bearing surfaces 38, 40.

It should be appreciated, that each of the aforementioned plates 20, 22, 24, 34, could be substituted with other structures having bearing surfaces for sealing against. Further, in some applications, such as machines that require minimal or infrequent rotation, the mounts 26, 36 can be eliminated and the drive and stationary plates 24, 34 can be mounted by other means, for example by shrinking the plates 24, 34 into reverse tapers or by gluing the plates into recessed holders.

A seal gland 44 is disposed over the stationary plate mount 36. The seal gland 44 is secured to the housing 16 of the seal chamber 14 by two bolts 45 and thereby closes the seal chamber 14.

Figure 2:
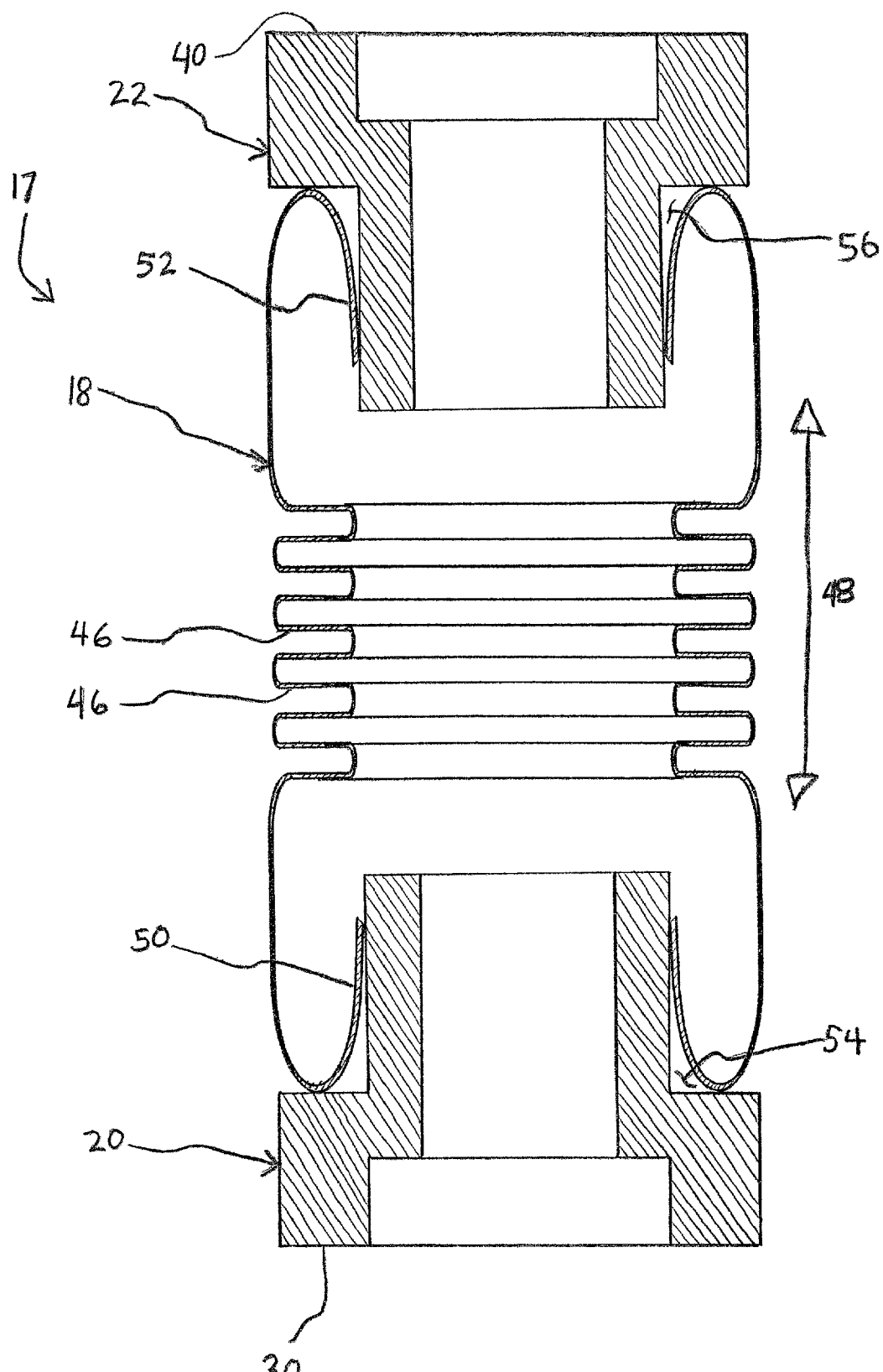
FIG. 2 shows a bellows seal assembly according to the invention.

Referring FIG. 2, the bellows 18, as the term is used herein, is a resilient tube which behaves like a compression spring. In the embodiment of FIG. 2, corrugations or ribs 46 provided to the bellows 18 provide a force 48 longitudinally along the axis of the drive shaft 10. The bellows 18 imparts this force 48 on the thrust plates 20, 22, biasing them outwardly against their respective plates 24, 34.

The bellows 18 can be formed of thin wall metal or plastic tubing, which can be seamless or welded. The corrugations 46 are formed in the tubing by a known hydraulic or rolling process. Alternatively, the bellows 18 can be formed by injection molding, by the lamination of a tube to a coil spring, or by another suitable process.

The bellows 18 also includes inwardly turned edges at each end. The inwardly turned edges form somewhat frustoconical or tapered collars 50, 52 for receiving the respective thrust plates 20, 22 therein. The thrust plates 20, 22 can be statically sealed to the bellows 18 by gaskets, such as elastomeric rings or sealants, such as epoxy, disposed, for example, in respective gaps 54, 56, between the thrust plates 20, 22 and the collars 50, 52. With proper selection of the gaskets or sealants, passage of molecules as small as nitrogen ($N_2$) can be blocked.

During operation of the machine 8, rotation of the drive shaft 10 causes rotation of the drive plate mount 26 and the drive plate 24. Depending on the instant force of friction between the bearing surfaces 28, 30 of the first dynamic seal 32 as compared to the instant force of friction between the bearing surfaces 38, 40 of the second dynamic seal 42, the bellows sealing assembly 17 will sometimes be driven by and rotate with the drive shaft 10 and at other times remain stationary.

The thrust plates 20, 22 are made of carbon, composite plastic, silicon carbide, or composite metal. Each of the members 20, 22, 24, 34 that have bearing surfaces 28, 30, 38, 40 are made of a graphite containing material, such as graphite filled carbon or silicon carbide. Relative rotation of bearing surfaces 28 and 30, 38 and 40 causes graphite in the members 20, 22, 24, 34 to form a lubricating graphite film therebetween. In this way, the respective interfaces between the drive plate 24, the stationary plate 34, and the thrust plates 20, 22 provide the dynamic seals 32, 42.

In the embodiment shown in FIGS. 1 and 2, the sealing assembly 17 provides two dynamic seals 32, 42 and the sealing assembly 17 alternates between driven and stationary operation (as explained above). According to alternative embodiments, a single seal can be provided.

A single seal can be provided, as one alternative, by securing one end of the bellows 18 directly to the stationary mount 36 so that the bellows 18 becomes a permanently stationary element. In this alternative, the second thrust plate 22 and the stationary plate 34 are eliminated.

A single seal could also be provided, as another alternative, by securing one end of the bellows 18 directly to the drive shaft 10 so that the bellows becomes a driven element. In this alternative, the first thrust plate 20 and the drive plate 24 are eliminated.

The present disclosure describes several embodiments of the invention, however, the invention is not limited to these embodiments. Other variations are contemplated to be within the spirit and scope of the invention.

What is claimed is:

1. A method for forming a resilient bellows for a sealing system in a rotating machine having a stationary element and a drive element rotationally connected to said stationary element, the method comprising steps of:

forming a bellows having a corrugated hollow body; and folding an end of the body inwardly to form a collar for receiving a plate.

2. A sealing system for a rotating machine having a stationary element and a drive element rotationally connected to said stationary element, the sealing system comprising:

a plate comprising a bearing surface, the plate for connecting to one of said drive element and said stationary element; and a sealing assembly comprising a resilient bellows and a bearing surface, the bellows having a plurality of corrugations and a tapered collar extending inwardly from an end of the bellows, and the bellows providing a force which causes the bearing surface of the sealing assembly to bear on the bearing surface of the plate to form a dynamic seal, the sealing assembly further comprising a thrust plate attached to the collar, the thrust plate providing said bearing surface of the sealing assembly;

wherein the sealing assembly further comprises a static sealing element, the static sealing element being disposed within a gap provided between the collar and the thrust plate.

* * * * *